(12) United States Patent
Adachi, Jr. et al.

(10) Patent No.: US 6,283,143 B1
(45) Date of Patent: Sep. 4, 2001

(54) SYSTEM AND METHOD FOR PROVIDING AN INTEGRATED GAS STICK

(75) Inventors: Richard S. Adachi, Jr., Fremont; An Le, San Jose, both of CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 09/540,152

(22) Filed: Mar. 31, 2000

(51) Int. Cl.[7] .................................................. F16K 49/00
(52) U.S. Cl. ......................... 137/341; 137/382; 137/884; 118/725
(58) Field of Search ..................... 137/883, 884, 137/382, 341, 377; 118/725

(56) References Cited

U.S. PATENT DOCUMENTS

| | | |
|---|---|---|
| 3,195,572 | 7/1965 | Carls . |
| 3,219,053 | 11/1965 | Hupp . |
| 4,741,354 * | 5/1988 | DeMild, Jr. ............................ 137/240 |
| 4,989,637 * | 2/1991 | Dittrich ................................. 137/599 |
| 5,662,143 | 9/1997 | Caughran . |
| 5,837,970 * | 11/1998 | Jilek ....................................... 219/201 |
| 5,915,414 * | 6/1999 | Seaman et al. . |
| 5,924,447 | 7/1999 | Evans et al. . |
| 5,964,481 | 10/1999 | Buch . |
| 6,102,068 * | 8/2000 | Higdon et al. ......................... 137/341 |
| 6,123,097 * | 9/2000 | Truong et al. ......................... 137/334 |
| 6,129,108 * | 10/2000 | Peng et al. ............................. 137/334 |

* cited by examiner

Primary Examiner—A. Michael Chambers
(74) Attorney, Agent, or Firm—Oppenheimer Wolff & Donnelly LLP

(57) ABSTRACT

The present invention discloses a gas delivery apparatus for control of process and purge gases is disclosed that is suitable for use in a semiconductor processing system. The gas delivery apparatus includes a base plate integrating a printed circuit board and a heating layer. In addition, the gas delivery apparatus includes a plurality of gas stick components mounted on the base plate. Specific gas components are coupled to the integrated printed circuit board, which provides an electrical interface to the control electronics.

20 Claims, 7 Drawing Sheets

Modular Gas Stick

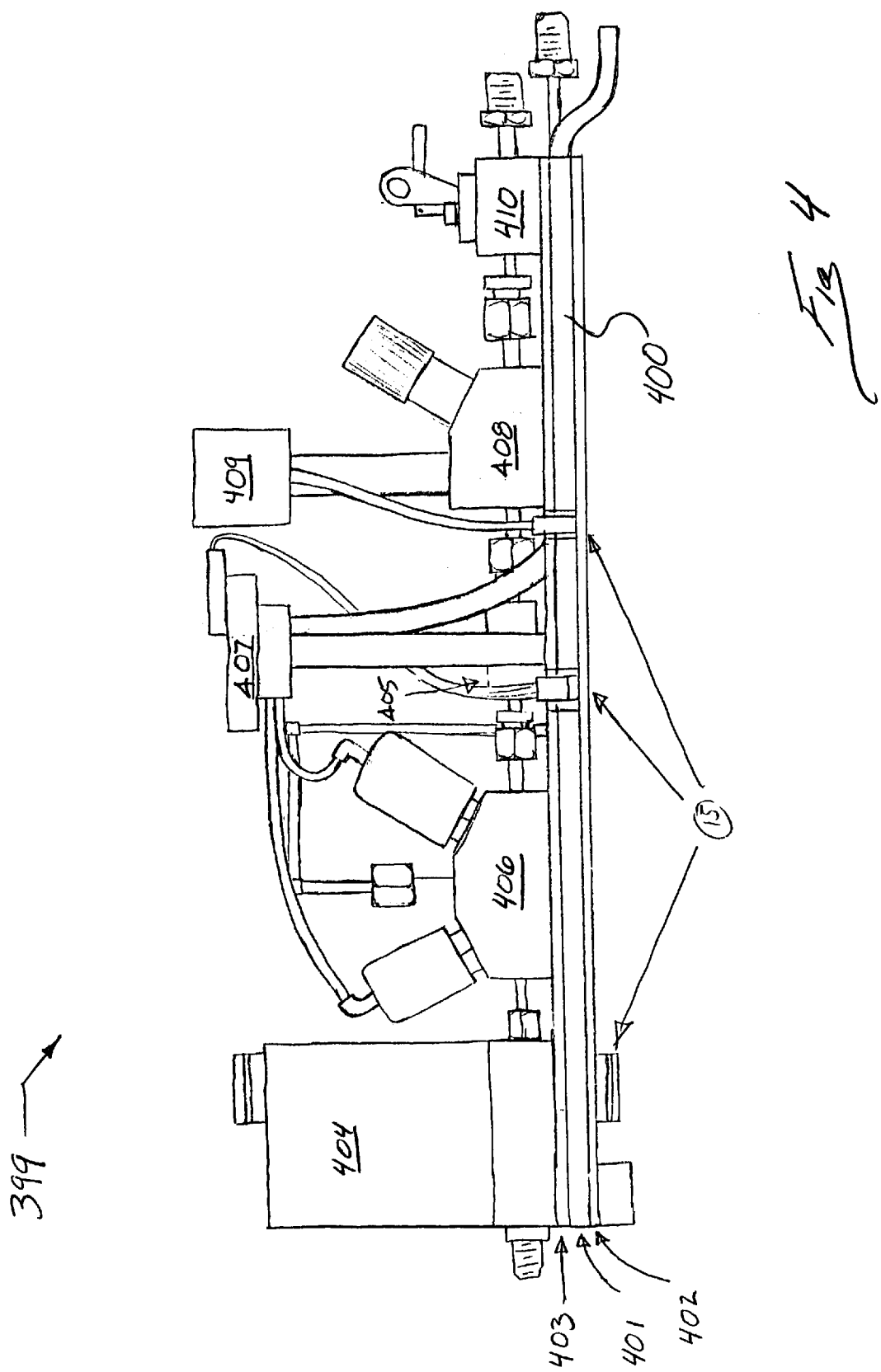

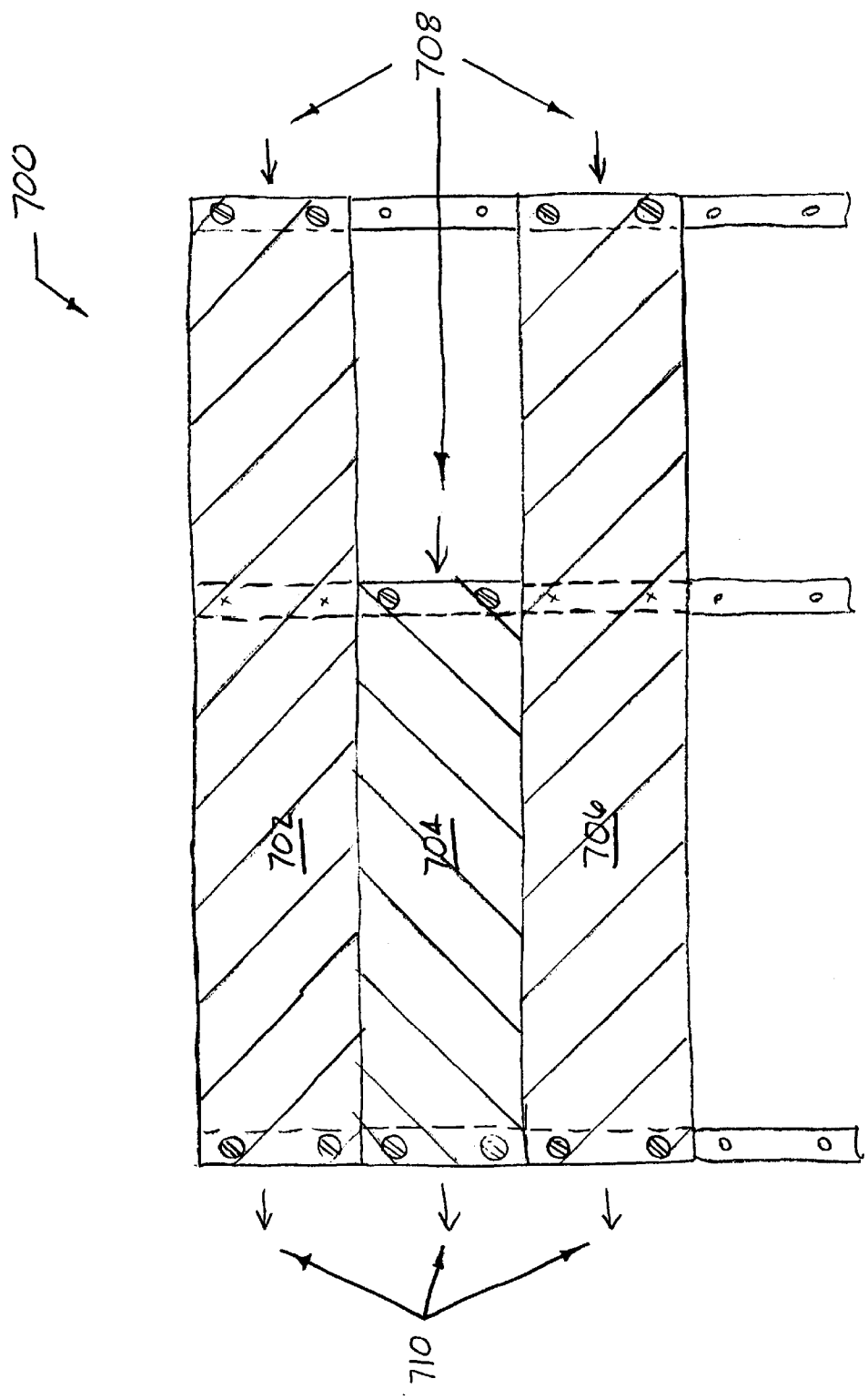

SYSTEM AND METHOD FOR PROVIDING AN INTEGRATED GAS STICK

BACKGROUND OF THE INVENTION

The present invention relates generally to modular gas delivery systems for semiconductor process equipment. More specifically, the present invention relates to integrated gas sticks for delivering hazardous and non-hazardous semiconductor process gases.

FIG. 1 is an illustration showing a conventional semiconductor processing system 100. The conventional semiconductor processing system 100 includes a gas source 102, a gas delivery system 104 connected to the gas source 102 via gas lines 106, and a processing chamber 108 connected to the gas delivery system 104. The gas delivery system 104 further includes gas sticks 110 coupled to the gas lines 106.

The conventional semiconductor processing system 100 depends on the use of several hazardous and non-hazardous processing gases and carefully measured delivery of a dozen gases from the gas source 102 to the processing chamber 108 via the gas lines 106 in a synchronized mode. Such systems usually require gas delivery systems 104 for coupling high purity gases for semiconductor processing systems.

Usually components of the gas delivery system 104 are mounted on a common plate before mounting in an enclosure and most are configured and designed to meet specific needs. This configuration poses draw backs including the time it takes to trouble shoot, rework, repair, and assemble. When tubes are welded to fittings, the generated heat during the welding process physically and chemically degrades the electropolish of the portion of the tube near the weld. The degraded portion of the heat effected zone is a further source of particle accumulation and contamination.

Thus conventional gas delivery systems 104 having a large number of fittings and welds are often incompatible with the requirements for ultra clean gas systems where extremely low levels of contaminants and particles are required. Additionally, gas boxes having excessive tubing require significant amounts of time to purge and isolate which can result in expensive downtime of essential manufacturing equipment. Still further, the more tubing a gas box has, the more wetted surface area it has, which increases its likelihood of being a source of contamination in a manufacturing process.

FIG. 2 is block diagram showing a conventional gas stick 110. The conventional gas stick 110 includes a mass flow controller 200, pressure sensor 202, regulator 204, filters 206, purge device 208, input shutoff valves 210, and a base plate 212 mounting the above components. In a typical semiconductor processing apparatus, multiple gas sticks 110 connect gas sources to processing chambers such as chemical vapor deposition systems or plasma etch systems. Generally, the gas sticks 110 are mounted on a frame called a gas box.

In semiconductor manufacturing, processes have become increasingly intolerant of particle contamination as the dimensions of semiconductor devices decrease and there is less room to accommodate more components. One source for particle contamination is the gas stick itself that delivers gases from the source of high purity gases to the semiconductor processing chamber where such particle contaminants commonly get deposited onto the semiconductor devices that are being processed. Another source for particle contamination is the exposure of components in a gas delivery system to room air during maintenance and repair of individual gas stick components.

In view of the forgoing, what is needed is an apparatus for rapidly and easily configuring a gas box which reduces or eliminates the numbers of welds, fixtures, and tubing incorporated therein. The apparatus should allow installation of components of the gas delivery system so as to save time to trouble shoot, rework, repair, and assemble. Moreover, the apparatus should lessen the excessive tubing required to purge gases in order to reduce the time to purge and significantly reduce the quantity of contaminants entering the semiconductor process system during installation and repair.

SUMMARY OF THE INVENTION

The present invention addresses these needs by providing an integrated gas delivery system. In one embodiment, a gas delivery apparatus for the control of process and purge gases is disclosed that is suitable for use in a semiconductor processing system. The gas delivery apparatus includes a base plate having a printed circuit board and an optional heating layer. In addition, the gas delivery apparatus includes a plurality of gas stick components mounted to the base plate. Specific gas stick components are coupled to the printed circuit board, which provides an electrical interface for specific gas stick components.

In another embodiment, a gas delivery system for the control of process and purge gases is disclosed that is suitable for use in a semiconductor processing system. The gas delivery system includes a base plate, and a plurality of integrated gas sticks coupled to the base plate. Each integrated gas stick includes a plurality of gas stick components and a base plate having a printed circuit board and a heating layer. Specific gas stick components of each integrated gas stick are coupled to the printed circuit board of the integrated gas stick, which provides an electrical interface for specific gas stick components of the integrated gas stick.

Advantageously, the present invention provides solutions to the delivery of process gases to a semiconductor process system such as a chemical vapor deposition system or a plasma etch system by reducing the time it takes to trouble shoot, rework, repair and assemble. The condensation of caustic gases can cause accelerated corrosion and additional contamination, but is reduced in the present invention by heating the gas components. This heating is accomplished by integrating a heating layer integrated into the base plate. The present invention also reduces the requirements for purging and particle contamination by reducing excessive tubing. The gas stick components themselves are standard, being chosen from gas delivery systems for semiconductor process equipment.

Moreover, the present invention provides solutions for manufacturing of semiconductor process equipment by minimizing the pneumatic plumbing, eliminating the electrical harness, providing for front access to the electronics such as the interface to a circuit board. Also, the integrated gas stick approach to gas box design enables on-the-fly configuration, reduced manufacturing time (for a gas box), improved serviceability, and improved servicing and manufacturing ergonomics. The gas stick itself is replaceable reducing the mean time to repair (or MTTR). Unlike the prior art, the input and the outputs of the gas sticks can originate or terminate at nonstandard locations in the gas box.

BRIEF DESCRIPTION OF THE DRAWINGS

The invention, together with further advantages thereof, may best be understood by reference to the following description taken in conjunction with the accompanying drawings in which:

FIG. 4 is an illustration showing an integrated gas stick, in accordance with an embodiment of the present invention;

FIG. 7 is an illustration showing a mixed integrated gas stick configuration, in accordance with an aspect of the present invention.

DETAILED DESCRIPTION OF THE PREFERRED EMBODIMENTS

An invention is disclosed for an integrated gas delivery system capable of modular assembly/disassembly and having an integrated printed circuit board (PCB) for electrical control and a heater for reducing condensation in gases. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
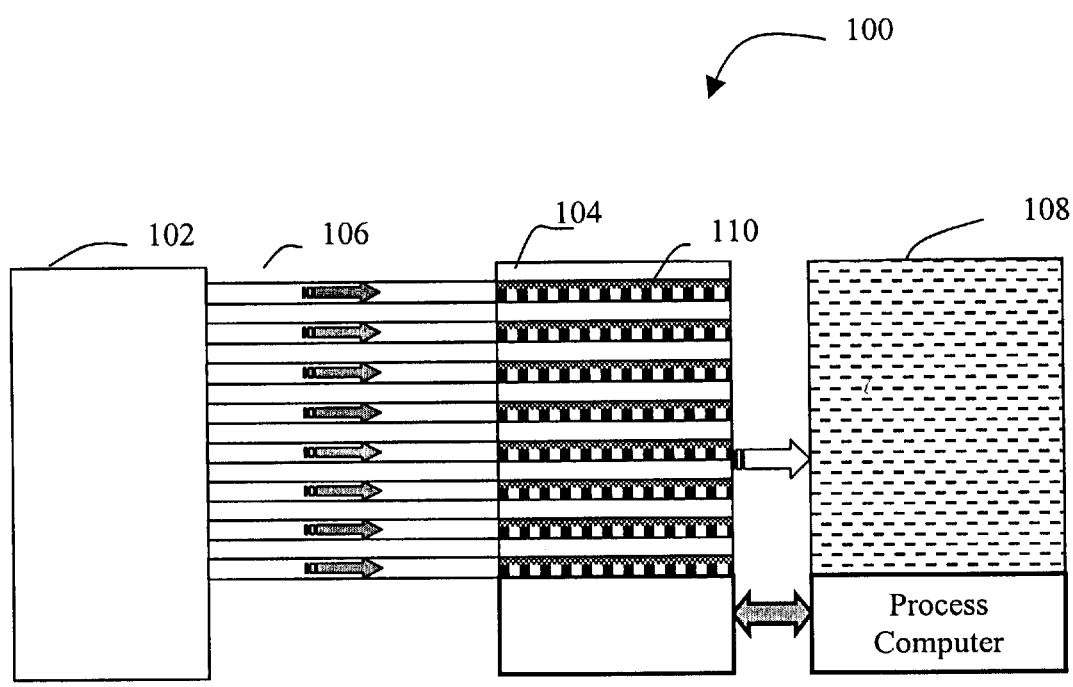
FIG. 1 is an illustration showing a prior art semiconductor processing system.
Figure 2:
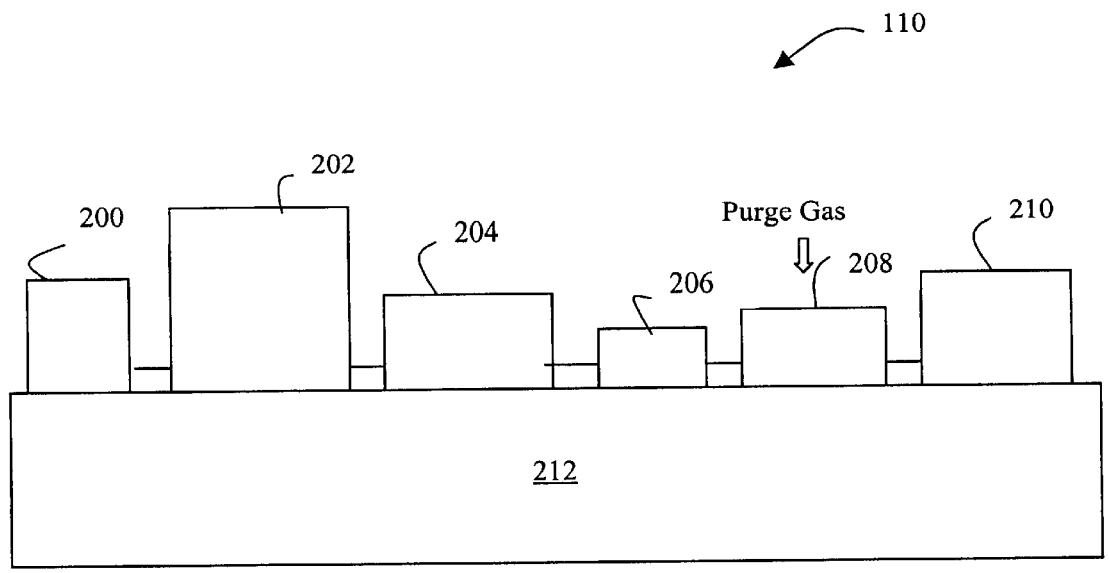
FIG. 2 is block diagram showing a prior art gas stick.
Figure 3:
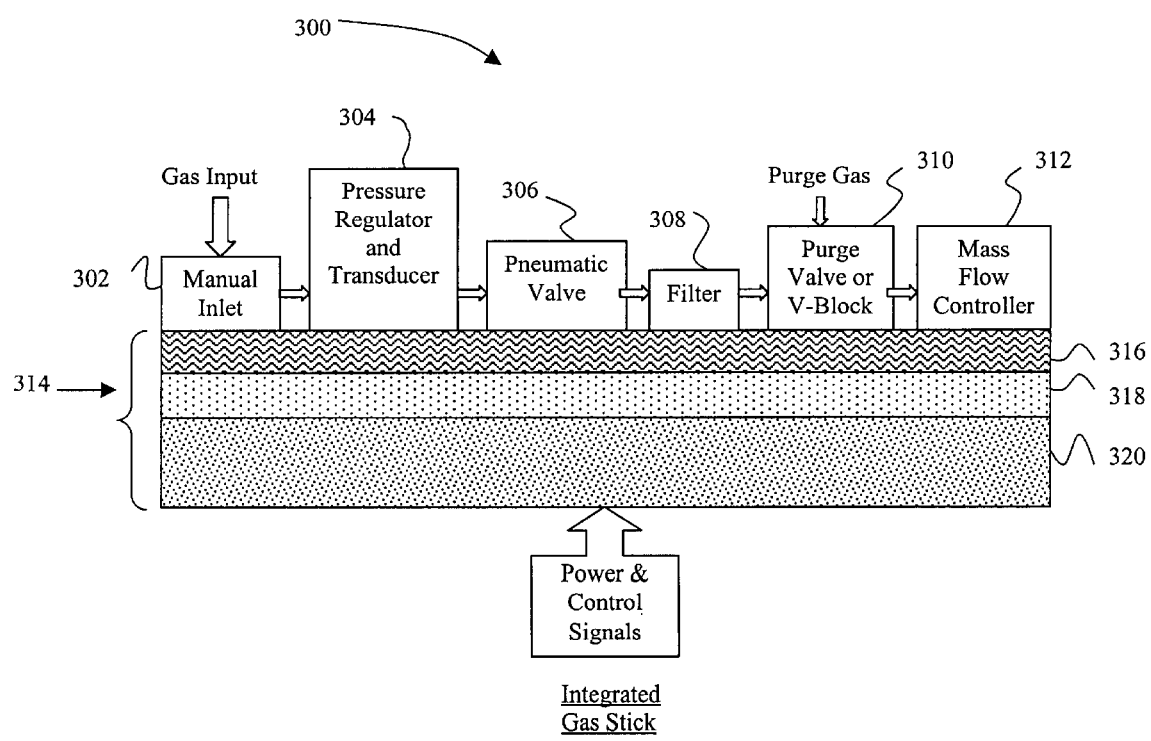
FIG. 3 is a block diagram illustrating an integrated gas stick, in accordance with an embodiment of the present invention.

FIGS. 1 and 2 were described in terms of the prior art. FIG. 3 is a block diagram illustrating an integrated gas stick 300, in accordance with an embodiment of the present invention. The integrated gas stick 300 includes a manual inlet 302, a pressure regulator and transducer 304, a pneumatic valve 306, a filter 308, a purge valve 310, and a mass flow controller 312. The integrated gas stick 300 further includes a base plate 314 attached to the above gas stick components having a heating layer 316, a stiffening element 318, and a PCB 320. In use, several individual integrated gas sticks 300 are mounted in a gas box for use as a gas delivery system.

The PCB 320 and heater layer 316 are integrated to form the base plate of the integrated gas stick 300. The base plate provides mechanical structure for the components of the gas line flow control (MFC), filter, purge valve (V-block), solenoid bank, pressure regulator, pressure transducer, inlet valve, heater, etc. The gas stick component's electrical interface is made through the integral PCB to the gas control system. By routing all of the electrical connections through the base plate, cable lengths to the electrical and electromechanical components are reduced and airflow is improved.

Conventionally, the gas sticks in a gas delivery system are mounted on a palette common to all the gas line components. This palette is in turn mounted in the gas box. The present invention segments the traditional palette into individual units. Each set of components is mounted on a base plate 314. The actual number of base plate (integrated gas stick) units is dependent on the gas requirements of the process. The number of integrated gas sticks typically ranges from three to twelve, however, the present invention is equally applicable for any number of gas sources and for any number of gas components.

The present invention provides integration of components in a gas delivery system so that it saves time to trouble shoot, rework, repair, and assemble, and also, lessens the contamination of particles in the gases that are delivered to semiconductor processing tools. The integrated gas stick technology reduces the pneumatic plumbing, eliminates electrical harness, provides front access to electronics, and enables on-the-fly configurations thereby reducing the mean time to repair (MTTR).

The integrated gas stick 300 of the present invention enables on-the-fly configuration, reduced time for manufacturing a gas box and improved ergonomics by allowing each gas stick 300 to be individually removed and mounted. Since each gas stick 300 is individually replaceable, the mean time to repair (or MTTR) is greatly reduced. Moreover, unlike the prior art, the input and the outputs of the gas sticks can originate or terminate at non-standard locations in the gas box, as described in greater detail subsequently.

With continuing reference to FIG. 3, as gas enters from a gas source, it enters the integrated gas stick 300 via the manual inlet valve 302 is opened. Each gas stick 300 is associated with an individual processing gas before the gases enter the processing chamber. The pressure regulator and transducer 304 control the pressure of the processing gas as it enters the gas stick 300. When a particular gas is needed, signals are sent to the transducer 304 of that particular gas stick 300 to respond. The transducer and the pressure regulator 304 in union control the passage of the particular processing gas along the gas stick 300. Since pressure in the gas sources can vary during gas delivery, a pressure regulator 304 is used to regulate the gas pressure in the integrated gas stick before the gas flow is metered by the MFC 312.

An integrated solenoid bank controls gas flow in the integrated gas stick. The solenoid bank converts electrical control signals (received from the control electronics) to pneumatic control signals. These signals in turn control the pneumatic valves which control the process gas and purge gas flow. The filter 308 is in place to reduce the amount of contaminants from process gas.

In semiconductor manufacturing, processes have become increasingly intolerant of particle contamination as the dimensions of semiconductor devices decrease resulting in less room to accommodate additional components. Dust and moisture are common sources for particle contamination and corrosion. Conventional gas sticks are usually the prime cause for particle contamination. The present invention reduces gas stick contamination through the use of a heater and filter, as described in greater detail subsequently.

An additional cause of particle contamination is exposure of gas stick components to room air during maintenance and repair of the gas stick components. Prior to manufacturing, extensive purging is done to eliminate any contaminates that act as obstructions to air flow. The mass flow controllers are usually used wherever accurate measurement and control of gas is required. Mass flow is usually measured by adding heat to a gas and monitoring the temperature change. From the First Law of Thermodynamics, $$Q = m\ Cp\ delta\ (T)$$

where if 'Q' is the heat lost to the gas flow, 'Cp' is the specific heat at constant pressure, and 'delta (T)' is the change in temperature, then 'm' or the mass flow can be determined from all the previous parametrics.

FIG. 4 is an illustration showing an integrated gas stick 399, in accordance with an embodiment of the present invention. The integrated gas stick 399 includes a base plate 400 having a stiffening element 401, a PCB 402, and a heater layer 403. The integrated gas stick 399 further includes a mass flow control (MFC) 404, a filter 405, a purge valve 406, a solenoid bank 407, a pressure regulator 408, a pressure transducer 409, and an inlet valve 410.

It should be borne in mind that the base plate 400 for the integrated gas stick 399 includes not only the stiffening element 401, but also a printed circuit board (PCB) 402 and a heater layer 403. Hence, the base plate 400 for the integrated gas stick 399 provides a mechanical support structure for the components of the integrated gas stick 399 and also provides power to the heating layer 403 and a printed circuit board 402 that routes the electrical connections from the components. In the present invention, electrical connections from the transducer, solenoid bank 407 and mass flow controller (or MFC) 404 are routed through the printed circuit board (or PCB) 402 integrated into the base plate 400. Short cables from these components plug directly into the base plate 400.

By routing all of the electrical connections through the base plate 400, cable lengths are reduced and airflow is improved. In addition, the heater layer 403 is integrated into the base plate 400 on the surface facing the components. The material supporting the heating element preferably made form a material, which has low thermal conductivity and high mechanical stiffness. To further reduce heat loss to the gas box, an insulating layer can be added. The power for the heater layer 403 is routed through the PCB 402 which is integrated in the base plate 400.

The base plate 400 provides support structure for the components of the integrated gas stick 399 such as: MFC 404, filter 405, purge valve (V-Block) 406, solenoid bank 407, pressure regulator 408, pressure transducer 409, and the inlet valve 410. These individual components of the integrated gas stick 399 are fastened onto the base plate 400 so that the alignment of the components is fixed. To reduce unintentional movement, which could cause stress to the gas stick components, the integrated gas stick is fastened to the gas enclosure.

During repair, rework or assembly, an individual gas stick 399 can be exchanged, replaced, or installed. The individual gas sticks do not require standardized locations for gas inlet and outlet. This level of flexibility allows for multiple configurations of gas sticks 399, provided that the appropriate mounting features are present in the gas box.

Generally, there are four categories of gases in semiconductor production: inert, toxic, caustic and flammable. Out of the four categories of gases, the first type is of least concern for exposure or accumulation in the gas box. The remaining three require purging (of the gas line) before servicing the components. If there is a leak in a gas line or a gas box carrying one of these gases, there can be severe consequences effecting both the hardware and the operators. In order to reduce this hazard, air in the box is purged at a rate sufficiently high to reduce "dead spots" where there is little or no air circulation.

The integrated solenoid bank 407 controls gas flow in the gas stick 399. Having a solenoid bank 407 on each gas stick 399 reduces the required length of pneumatic lines as they are kept short and direct. This further improves the airflow in the gas box.

Further, a common reason for the obstruction of the airflow in gas delivery systems occurs from the cabling of electrical and pneumatic harness that lace through the gas box enclosure. By eliminating much of the cabling and the pneumatic harnesses, the required airflow through the gas box can be achieved. In the present invention, much of the cabling runs through the integrated printed circuit board (PCB) 402. This cabling includes the short cabling from the transducer 409, solenoid 407, and the MFC 404 that plug directly into the base plate of the individual gas stick 399. Also, in the present invention, bulky pneumatic lines are reduced by placing the solenoids 407 adjacent to the pneumatic source, so that the solenoid 407 controls the signals interfaced by the PCB 402.

Figure 5B:
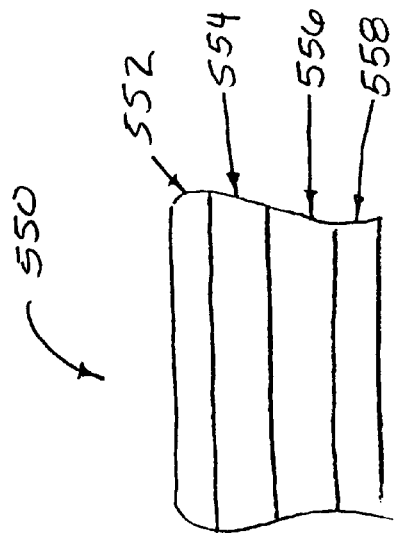
FIG. 5B is an illustration showing a cross-sectional view of a four layer base plate, in accordance with another embodiment of the present invention.
Figure 5A:
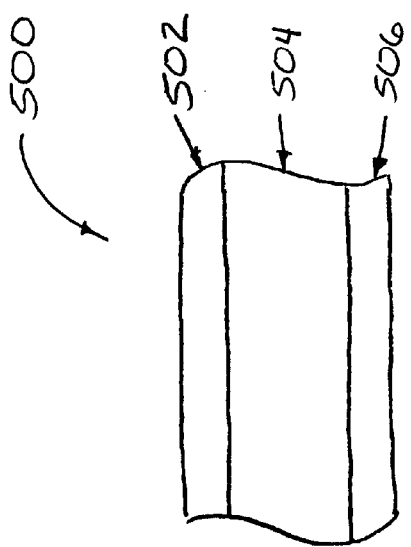
FIG. 5A is an illustration showing a cross-sectional view of a three layer base plate, in accordance with an embodiment of the present invention.

FIG. 5A is an illustration showing a cross-sectional view of a three layer base plate 500, in accordance with an embodiment of the present invention. The three layer base plate 500 includes a heating layer 502, a stiffener layer 504 disposed below the heating layer 502, and PCB 506 located below the stiffener layer 504. Preferably the stiffener layer 504 is composed of a low thermal conductivity material. In FIGS. 5A and 5B, the stiffening layer, PCB and Insulating layer need not be in this order. Their stacking order can be changed to meet requirements of a specific design.

As stated previously, the base plate 500 includes not only the stiffening layer, but also a printed circuit board 506 and a heater layer 502. Hence, the base plate 500 of the present invention provides a mechanical support structure for the components of the integrated gas stick and also provides a supply line for the heater layer 502 and a printed circuit board 506 that routes the electrical connections from the components. In the present invention, electrical connections from the transducer, solenoid and mass MFC are routed through the PCB 506 integrated into the base plate 500. Short cables from these components plug directly into the base plate 500.

It should be borne in mind that not all gas lines require heating, hence the use of a heater layer 502 is optional. However, for lines that require heating, the heater layer 502 provides the required heat to the processing gas. For example, caustic gases tend to condense in the gas line and cause accelerated corrosion. The heating layer 502 reduces condensation by providing heat to the gas line.

FIG. 5B is an illustration showing a cross-sectional view of a four layer base plate 550, in accordance with another embodiment of the present invention. The four layer base plate 550 includes a heating layer 552, an insulator layer 554 disposed below the heating layer 552, a stiffener layer 556 located below the insulator layer 554, and a PCB 558 disposed below the stiffener layer 556.

During operation, the insulating layer 554 of the base plate 550 provides additional insulation from the gas box. If more heat is lost in heating the gas box, more heat will have to be generated by the heating layer. This not only increases the power requirement of the heating layer, but also the requirement of the power supplies providing the heater with power. Providing this additional insulating layer will improve heating efficiency and keep unnecessary heat from adjacent integrated gas sticks.

Figure 6:
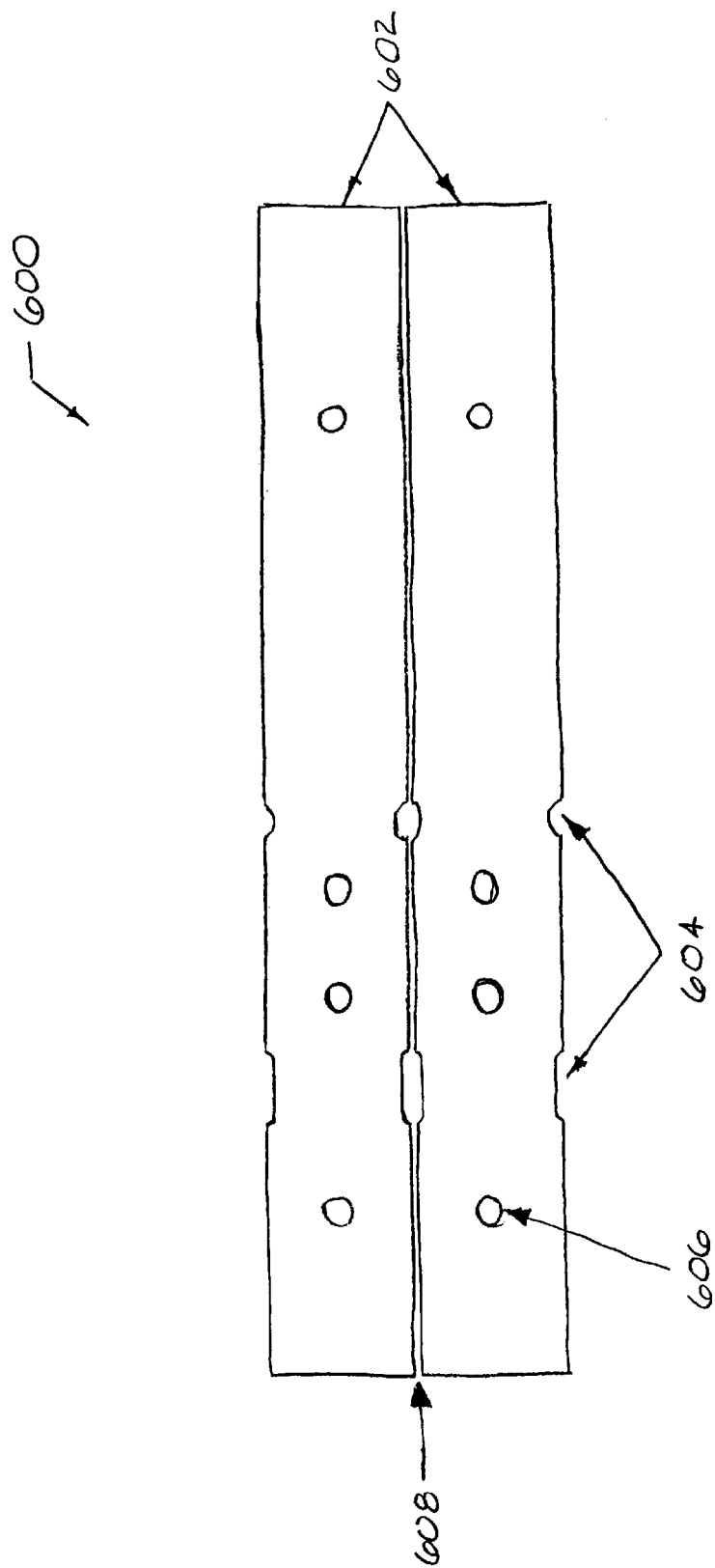
FIG. 6 is an illustration showing a top view of a base plate, in accordance with an embodiment of the present invention.

FIG. 6 is an illustration showing a top view of a base plate 600, in accordance with an embodiment of the present invention. The base plate 600 includes adjacent integrated gas stick base plates 602 having notches 604 and "through holes" 606. In addition, a controlled gap 608 is located between adjacent integrated gas stick base plates 602.

The base plate 600 as well as the PCB and the heating layer employ notches 604 and "through holes" 606 in conjunction with the gas box design. Together with plenums and manifolds built into the gas box, these features (604, 606, 608) control the air flow in the gas box, minimize dead spots, and, thereby, reduce the amount of air required to keep the gas box free of dead spots.

FIG. 7 is an illustration showing a mixed integrated gas stick configuration 700, in accordance with an aspect of the present invention. The integrated gas stick configuration 700 includes gas sticks 702, 704, and 706, integrated gas inputs 708, integrated gas outputs 710.

As shown in FIG. 7, the length of each gas stick 702, 704, and 706 need not be uniform. Since each integrated gas stick is independently mountable there is no need for uniform lengths in gas sticks. Each gas stick may be only as long as required for the specific process gas it is providing to the process chamber. Thus, the present invention provides further reduced gas contamination by allowing gas sticks to be as short as possible. Since the processing gas then travels a shorter distance to the processing chamber, the amount of gas contamination is greatly reduced.

While the present invention has been described in terms of several preferred embodiments, there are many alterations, permutations, and equivalents which may fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A gas delivery apparatus for control of process and purge gases, the gas delivery apparatus suitable for use in a semiconductor processing system, the gas delivery apparatus comprising:
    a base plate comprising a printed circuit board and a heating layer wherein the printed circuit board and the heating layer each substantially define a plane and the two defined planes are substantially parallel one another;
    a plurality of gas stick components mounted to the base plate, wherein specific gas stick components are electrically coupled to the printed circuit board through the heating layer.

2. A gas delivery apparatus as recited in claim 1, wherein the base plate further includes a heating layer, the heating layer capable of providing heat to gas flowing through the gas stick components.

3. A gas delivery apparatus as recited in claim 2, wherein the base plate further includes an insulating layer, the insulating layer reducing heat transfer to a gas box.

4. A gas delivery apparatus as recited in claim 1, wherein the base plate further includes a stiffening layer, the stiffening layer providing mechanical support for the plurality of gas stick components.

5. A gas delivery apparatus as recited in claim 4, wherein the stiffening layer comprises a low thermal conductivity material.

6. A gas delivery apparatus as recited in claim 1, wherein the base plate and plurality of gas stick components are independently mountable in a gas box.

7. A gas delivery apparatus as recited in claim 6, wherein the base plate and plurality of gas stick components are capable of being used in conjunction with other gas sticks of variable length.

8. A gas delivery apparatus as recited in claim 1, wherein the base plate as through holes.

9. A gas delivery apparatus as recited in claim 1, wherein the plurality of gas stick components include a purge valve.

10. A gas delivery apparatus as recited in claim 1, wherein the plurality of gas stick components include a pressure regulator.

11. A gas delivery system for control of process and purge gases, the gas delivery system suitable for use in a semiconductor processing system, the gas delivery system comprising:
    a gas box;
    a plurality of integrated gas sticks coupled to the gas box, wherein each integrated gas stick includes a plurality of gas stick components and a base plate comprising a printed circuit board and a heating layer wherein the printed circuit board and the heating layer each substantially define a plane and the two defined planes are substantially parallel one another, wherein specific gas stick components of each integrated gas stick are electrically coupled to the printed circuit board of that integrated gas stick through the heating layer.

12. A gas delivery system as recited in claim 11, wherein the base plate of each integrated gas stick further includes a heating layer, the heating layer capable of providing heat to gas flowing through the gas stick components.

13. A gas delivery system as recited in claim 12, wherein the base plate of each integrated gas stick further includes an insulating layer, the insulating layer reducing heat transfer to the gas box.

14. A gas delivery system as recited in claim 11, wherein the base plate of each integrated gas stick further includes a stiffening layer, the stiffening layer providing mechanical support for the plurality of gas stick components.

15. A gas delivery system as recited in claim 14, wherein the stiffening layer comprises a low thermal conductivity material.

16. A gas delivery system as recited in claim 11, wherein each integrated gas stick is independently mountable in a gas box.

17. A gas delivery system as recited in claim 16, wherein each integrated gas stick is capable of being used in conjunction with other integrated gas sticks of variable length.

18. A gas delivery system as recited in claim 11, wherein the base plate of each integrated gas stick has through holes.

19. A gas delivery system as recited in claim 11, wherein the plurality of gas stick components of each integrated gas stick include a purge valve.

20. A gas delivery system as recited in claim 11, wherein the plurality of gas stick components of each integrated gas stick include a pressure regulator.

* * * * *